Figure 1:
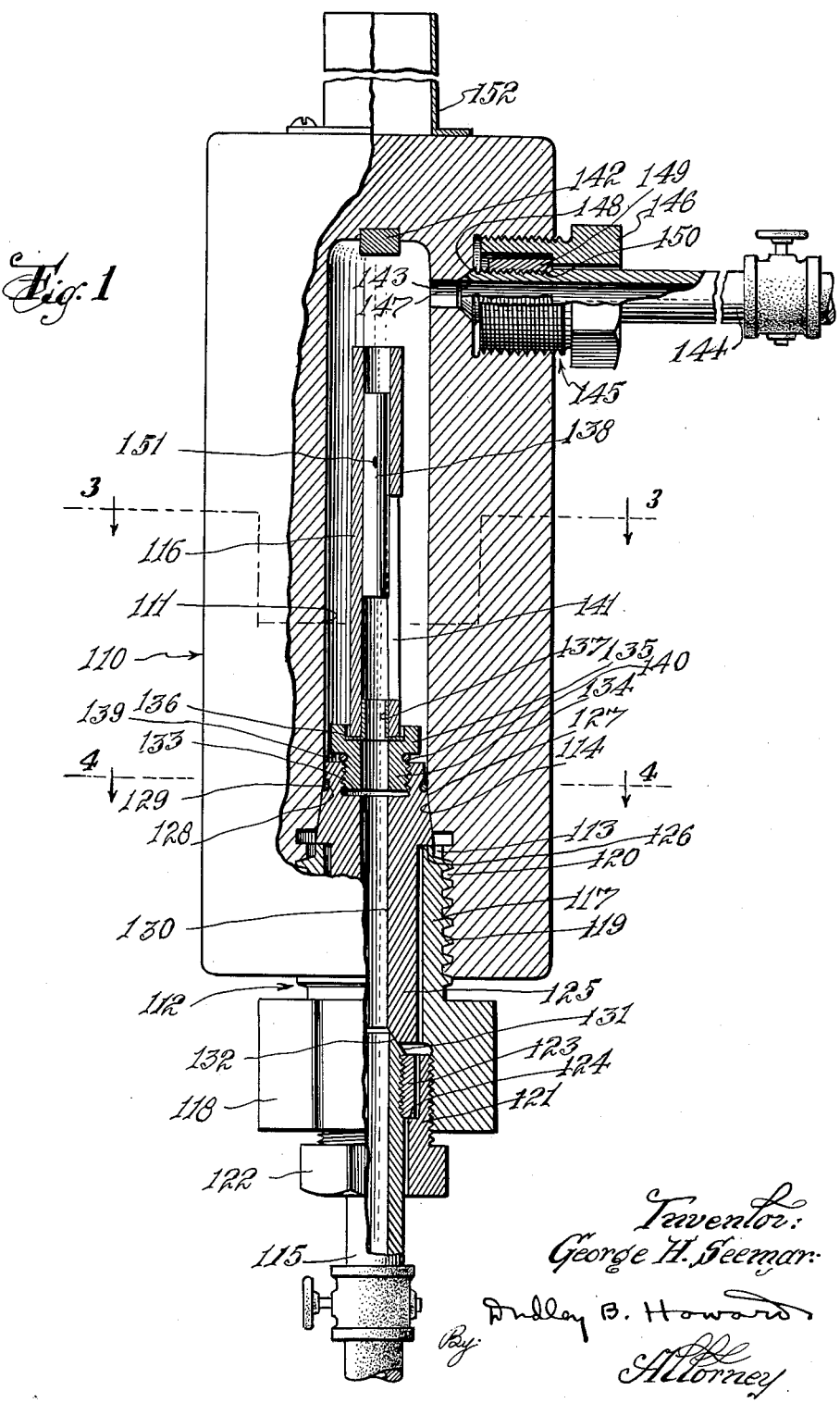

Nov. 14, 1961

G. H. SEEMAR 3,008,330

ORIFICE TUBE FLOW METER

Filed Feb. 6, 1956

2 Sheets-Sheet 1

Inventor:
George H. Seemar
By Dudley B. Howard
Attorney

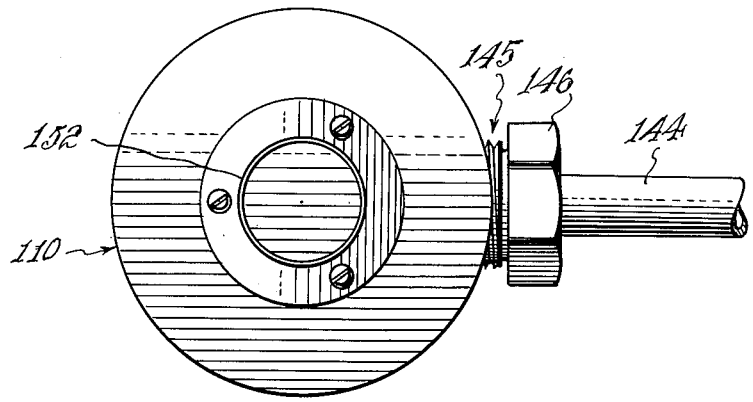
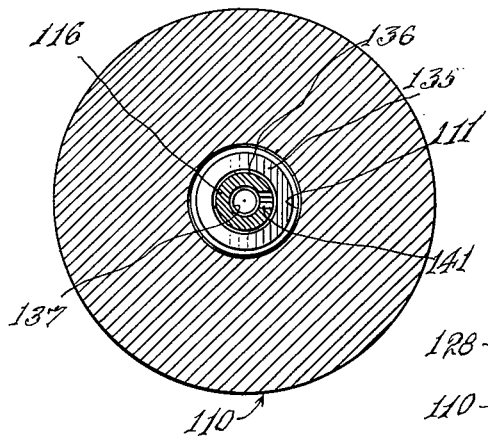
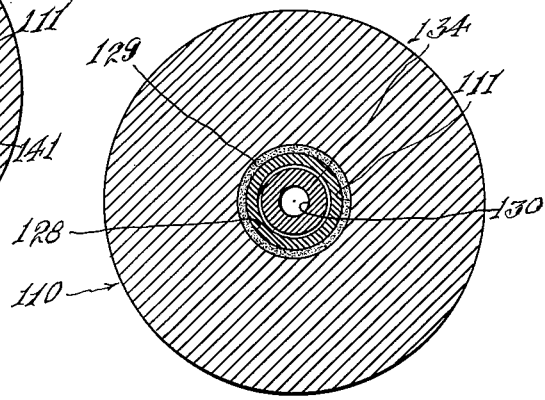

…

United States Patent Office
3,008,330
Patented Nov. 14, 1961

3,008,330
ORIFICE TUBE FLOW METER
George H. Seemar, Chatham, N.J., assignor to C-Mar Corporation, Manasquan, N.J., a corporation of New Jersey
Filed Feb. 6, 1956, Ser. No. 563,595
1 Claim. (Cl. 73—208)

The invention relates in general to flow meters for measuring and indicating the rate of flow of fluids in pipe lines and has particular reference to meters of the type wherein an axially movable float is mounted in a vertically extending tube having an orifice in its lateral wall whereby moving fluid from the pipe line is admitted to the orifice bearing tube beneath the float in a manner to lift the float to a linear degree directly proportional to the rate of flow, the float being operationally coordinated in its rise and fall with a visual indicator to translate the degree of linear vertical displacement of the float into indications of rate of flow.

By utilizing ultrasonic grinding means to produce the orifice in the lateral wall of each tube, the cross-sectional form and area of all the orifices in a great number of orifice tubes will be so identically standardized that perfect interchangeability of tubes has been achieved. In other words, when an orifice tube which is already installed in a flow meter becomes defective and requires replacement, an interchangeable tube may be installed in its place without having to re-calibrate the rate of flow indicating scale.

Prior to my present invention, the means by which interchangeable orifice tubes have been mounted in the casing of a flow meter has been such that the speed of replacement is undesirably slow.

It, therefore, is the primary object of my present invention to provide improved so-called "Quick-Out" mounting means for the interchangeable orifice tubes which can be easily and quickly screwed into and out of a receiving mouth provided in the bottom of the flow meter casing and which includes means to insure a fluid-tight seal for the casing mouth when a substitute orifice tube has been installed.

Further objects, features and advantages of the invention will become apparent as the following specific description is read in connection with the accompanying drawing, in which:

FIG. 1 is a fragmentary side elevational view, partly in longitudinal section, of an illustrative embodiment of the invention; FIG. 2 is a top plan view of the same; FIG. 3 is a horizontal cross-section on line 3—3 of FIG. 1; and FIG. 4 is a similar view on line 4—4 of FIG. 1.

This application is a continuation-in-part of my copending application bearing Serial Number 527,755, filed August 11, 1955, for improvements in Tapered Orifice Flow Meter, which latter application was expressly abandoned February 29, 1956.

Referring now in detail to the drawings, wherein like reference characters designate corresponding parts in the several views, there is disclosed an illustrative embodiment of my improved type of flow meter which has been purposely designed to meet the demand for an instrument which can withstand very high fluid pressure, such as that of the order of 15,000 pounds per square inch at 100 degrees Fahrenheit.

It will be observed that the instrument includes a casing 110 which preferably is cylindrical in cross-section and arranged with its axis vertical. Because the instrument is intended to measure the rate of flow of fluids being supplied under high pressure, the walls of casing 110 are very thick as compared with those of flow meters employed for moderate-pressure supply lines. For the same reason and also to prevent internal corrosion which would affect the functional efficiency of the instrument, casing 110 preferably is made of stainless steel, but it is to be understood that glass or any other suitable materials, such as Pyrex and certain ceramics, may be employed in fabrication of the casing.

The internal chamber 111 of casing 110 is circular in cross-section concentric to the casing axis and opens through the lower end thereof only. The upper end of chamber 111 terminates at a sufficient distance from the upper end of casing 110 to afford a top wall of safe thickness and may be dome-shaped to avoid danger of pressure-fracture and to facilitate smooth flow of fluid into the outlet port which will be described in detail later herein.

An inlet assembly 112 is adapted to be removably engaged with the lower end of casing 110. It being preferred to have inlet assembly 112 project into the lower end of casing chamber 111, the latter is enlarged in diameter to provide a mouth 113 and a downwardly flaring throat 114 leading from said mouth to the major portion of chamber 111.

Inlet assembly 112 is designed to accomplish two principal purposes. Primarily, it serves to connect fluid supply pipe 115 to casing 110 in communication with chamber 111 in a fluid-tight manner under conditions of very high internal pressure. The other principal purpose is to mount the orifice tube 116, which will be described in detail presently, in a removable manner in operative position inside chamber 111. To this end, inlet assembly 112 includes a comparatively large nipple 117 having a wrench-engageable head 118 at its lower, or outer, end. The upper portion of nipple 117 is provided with external screwthreads 119 of a type best suited to withstand the effects of high pressure for engagement with mated internal threads 120 provided in mouth 113 of casing 110. The head 118 of nipple 117 is internally threaded for engagement with an externally threaded sleeve 121 that has a wrench-engageable head 122 at its lower end.

The upper portion of sleeve 121 is internally reamed out to receive an adjustment ring 123 which is internally threaded for application to the externally threaded upper end of fluid supply pipe 115. The reamed out portion of sleeve 121 provides an upwardly facing shoulder 124 upon which adjustment ring 123 may rest and thereby support fluid supply pipe 115.

In order to mount orifice tube 116 in its desired position within chamber 111 of casing 110 concentric to the axis thereof, an axially bored tube mounting member 125 is adapted to be located inside nipple 117. Throughout the major portion of its length from the lower end thereof, tube mounting member 125 is reduced in external diameter to afford frictionless clearance from the internal surface of nipple 117 during adjusting rotation of the latter and also to provide a downwardly facing shoulder 126 to rest upon the top rim of said nipple. Above shoulder 126, tube mounting member 125 is upwardly tapered as at 127 to evenly fit the downwardly flared throat 114 of casing chamber 111. As a result of this even fit between frusto-conical faces, the upper end of tube mounting member 125 may be clamped in a hermetically sealed joint with chamber 111 by screwing nipple 117 tightly inward. To further increase the sealing effect, an annular groove 128 is formed externally on the upper end of tube mounting member 125 immediately above the tapered portion 127 to receive a tubular sealing ring 129 of elastic material, such as Teflon.

The axial bore 130 of tube mounting member 125 will be in registration with fluid supply pipe 115 to afford open communication between the latter and orifice tube 116 in a manner which will be described presently. In order to seal the joint between fluid supply pipe 115 and bore 130 of tube mounting member 125, the extremity of said supply pipe is externally tapered at 131 and the lower end of said bore is downwardly flared at 132 to provide mating frusto-conical surfaces. Initial sealing adjustment to effect a tight fit between surfaces 131 and 132 may be accomplished by screwing adjustment ring 123 downward on the screwthreaded upper end of fluid supply pipe 115. Further tightening of the sealing joint is effected by screwing sleeve 121 upward in nipple 117.

Tube mounting member 125 is provided at its upper end with a threaded attachment socket 133 to removably engage the mated threaded stem 134 of the base 135 of each of a set of interchangeable orifice tubes. Each tube base 135 has an upwardly presented seating socket 136 to receive the lower end of the corresponding orifice tube. Although the seating sockets of the respective orifice tube bases 135 of a set may differ in internal diameter to fit the corresponding tubes, the stems 134 of all of them will be of one standard diametrical size to fit the attachment socket 133 of tube mounting member 125.

Each orifice tube preferably has a ferrule 137 fitted snugly into its lower end and similarly snugly fitted into seating socket 136 of base 135 in order to maintain said tube rigidly in erect position and also to serve as a bottom limiting stop for float 138 that is mounted for vertical reciprocation in the orifice tube under the influence of fluid flow and pressure. A shoulder 139 is provided immediately above stem 134 in directly opposed relation to the top rim of tube mounting member 125 to clamp a tubular sealing ring 140 of elastic material, such as Teflon, in sealing contact with said rim of member 125.

Each orifice tube 116 of a set preferably is made of precision bore metallic or glass tubing of appropriate diameter and has an orifice 141 of desired marginal configuration in its side wall produced by precision drilling methods. The base end of each orifice 141 should be flush with the top rim of ferrule 137 to define the zero reading point when float 138 is resting upon said ferrule as a limiting stop.

The length of float 138 should be considerably greater than the distance between the upper end of each installed orifice tube and the top wall of casing chamber 111. This is to prevent the float from being blown out of the orifice tube and rendered inoperative. A block-like stop member 142 of elastic material, such as Teflon, may be countersunk in the top wall of casing chamber 111 in axial alignment with orifice tube 116 to absorb the shock of impact whenever the float 138 happens to be projected forcibly upward by inlet fluid pressure.

The orifice tubes of any interchangeable set will vary in structure principally in internal diameter and in the shape and length of their respective orifices.

Outlet port 143 for casing 110 preferably is located in horizontally extending position in the side wall thereof at a level between the top wall and the upper end of orifice tube 116. The inner portion of outlet port 143 is equal in diameter to the internal diameter of fluid delivery pipe 144, whereas the outer portion of said port is greatly enlarged and screw-threaded to engage a correspondingly screwthreaded securing sleeve 145 having a wrench-engageable head 146. The inner and outer portions of outlet port 143 are connected by an intervening inwardly tapered throat 147 to fit the correspondingly tapered end face 148 of fluid delivery pipe 144. An adjustment ring 149 is threaded onto fluid delivery pipe 144 for longitudinal adjustment thereon and is adapted to abut an inwardly facing internal shoulder 150 formed on sleeve 145 by internal chamfering. As in the case of the inlet assembly structure, sleeve 145 may be screwed inward to press the frusto-conical face 148 of fluid delivery pipe 144 into fluid-tight contact with the mated frusto-conical face of throat 147 in outlet port 143.

In order to permit measurement of the rate of flow of fluid through orifice 141 of the installed tube 116, as determined by the upthrust of float 138, an isotope pellet 151 may be fixedly positioned in said float for cooperation with electronic indicating means of conventional form (not shown) housed in probe adapter 152 surmounting casing 110.

Whenever it becomes necessary to substitute a different orifice tube for the one already installed inside casing 110, all that has to be done is to disconnect fluid supply pipe 115 from inlet assembly 112, by unscrewing sleeve 121; then unscrew nipple 117 to permit removal of said assembly from the casing; then detach the base 135 of the orifice tube to be replaced from attaching socket 133 in tube mounting member 125 and attach the replacement tube in said socket; next screw nipple 117 back into casing 110; and finally re-connect fluid supply pipe 115 to said inlet assembly by screwing sleeve 121 back into nipple 117.

In the operation of the high pressure embodiment of my flow meter just described, there are certain safety measures to be observed. For instance, results to the orifice tube and its float could be disastrous if the fluid whose flow rate is to be determined were admitted to casing 110 through inlet assembly 112 while outlet port 143 is in closed condition. This is because float 138 is merely resting upon stop means 137 as a seat. With practically no cushioning effect to be expected from compression of the volume of captivated air in the interior chamber of casing 110, float 138 undoubtedly would be discharged violently through orifice tube 116 against stop member 142 at the top of the chamber. This action could result in the breaking of float and tube. If, however, the outlet valve be opened first, all that can happen will be that back pressure in delivery pipe 144 will force float 138 more and more tightly against its seat on stop means 137, but without any impact. After the outlet valve is fully open, the inlet valve can be opened with safety. As it is gradually opened, the inlet pressure will be built up steadily until it equals and then slightly exceeds the back pressure which is being exerted on the upper end of float 138. At this juncture, initial upward movement of float 138 and consequent opening of orifice 141 should be detectable by observation of the indicating means. Thereafter, continued opening of the inlet valve will only move float 138 upward in the desired steady manner until its flow measuring position has been reached.

It is to be understood that, although disclosure of the invention in the illustrative embodiment shows the casing with its orifice tube and float to be axially vertical, I do not intend to be restricted to this particular axial arrangement. It is conceivable that in some situations encountered in the future a horizontal or inclined axial arrangement may be desirable and practical. Any such changes in the angular arrangement of the fundamental structural elements of my instrument are considered to be within the scope of the invention.

While the invention has been illustrated and described with respect to a particular embodiment thereof, it will be understood that it is intended to cover all changes and modifications of the embodiment shown which do not constitute departures from the spirit of the invention and scope of the appended claim.

I claim:

A flow meter comprising: a casing having an interior chamber provided with a mouth opening through the bottom wall of said casing and having a downwardly flaring throat and provided with an outlet port; an inlet assembly removably engageable in fluid-tight manner with said chamber mouth and including a tubular mounting member; an orifice tube having a lateral orifice in its side wall and adapted to be mounted in vertical position in said chamber on the upper end of said mounting member in communication therewith; a float of cross-sectional configuration corresponding to that of the orifice tube axially slidable along said tube in a manner to mask the orifice thereof in varying degrees from completely closed condition to open condition under the influence of fluid flow in said tube; means to indicate the height of the float in relation to the orifice tube and corresponding rate of fluid flow; means to removably attach the lower end of the orifice tube to the upper end of the mounting member; the mounting member of the orifice tube mounting means being provided with an annular downwardly facing external shoulder near its upper end and being exteriorly upwardly tapered above said shoulder to evenly fit the flaring throat of the casing chamber mouth; and a nipple surrounding the lower end portion of said mounting member in screw-threaded engagement with the mouth of the casing chamber and having its upper end engaged with the shoulder of said mounting member, whereby the tapered portion of said mounting member may be forced into fluid-tight fit within the flaring throat of the mouth of the casing chamber.

References Cited in the file of this patent

UNITED STATES PATENTS

| | | |
|---|---|---|
| 341,841 | Gleason | May 11, 1886 |
| 701,382 | Patten | June 3, 1902 |
| 921,477 | Spachtholz et al. | May 11, 1909 |
| 1,274,642 | Wagner | Aug. 6, 1918 |
| 1,303,073 | Lambert | May 6, 1919 |
| 1,479,873 | Schroeder | Jan. 8, 1924 |
| 1,641,744 | Decker | Sept. 6, 1927 |
| 2,052,022 | Fisher | Aug. 25, 1936 |
| 2,203,577 | O'Neill et al. | June 4, 1940 |
| 2,210,081 | Humphrey | Aug. 6, 1940 |
| 2,367,176 | Ahlstrom et al. | Jan. 16, 1945 |
| 2,372,166 | McCarty | Mar. 20, 1945 |
| 2,554,715 | Mellett | May 29, 1951 |
| 2,674,880 | Broderson | Apr. 13, 1954 |
| 2,736,144 | Thatcher | Feb. 28, 1956 |